(No Model.) 2 Sheets—Sheet 1.
D. E. BARTON.
CONVERTIBLE FRUIT CAR.
No. 523,065. Patented July 17, 1894.
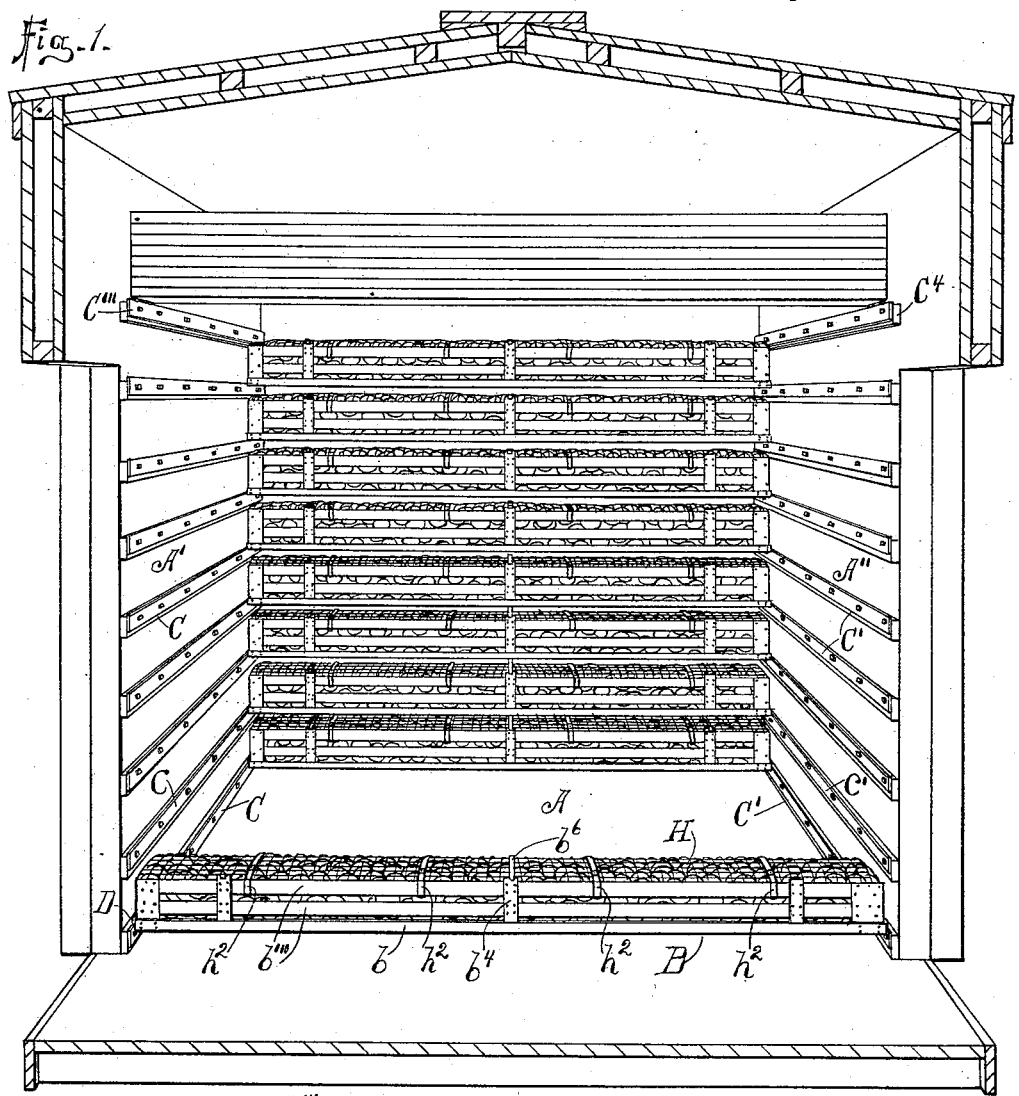
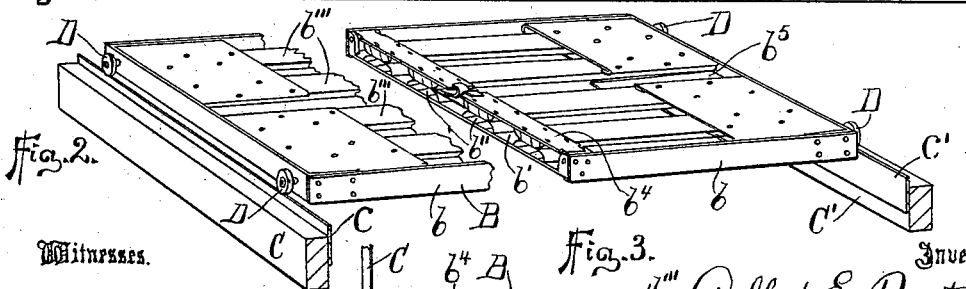
Witnesses.
P. W. Harbison.
F. M. Townsend.
Inventor.
Delbert E. Barton
by
Hazard & Townsend
his Attys.
THE NORRIS PETERS CO., PHOTO-LITHO., WASHINGTON, D. C.

(No Model.) 2 Sheets—Sheet 2.
D. E. BARTON.
CONVERTIBLE FRUIT CAR.
No. 523,065. Patented July 17, 1894.
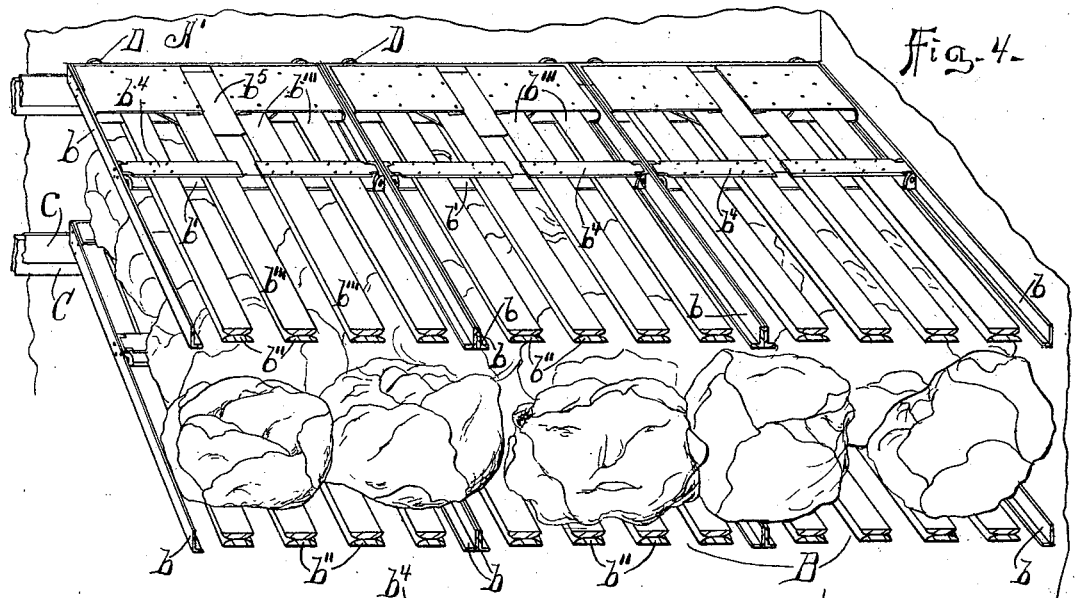
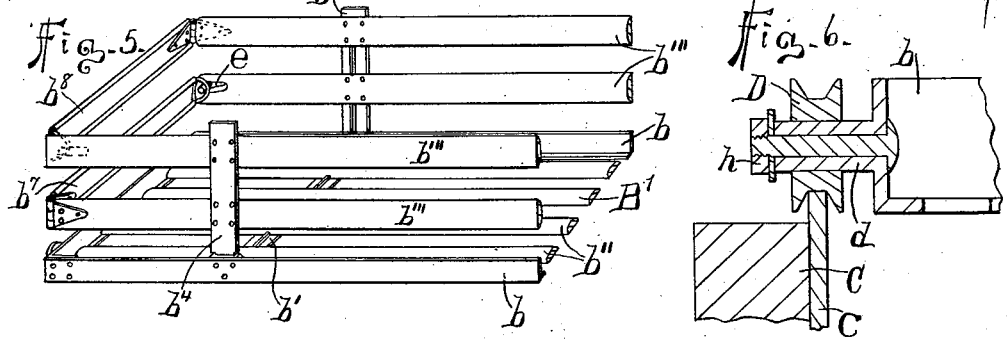
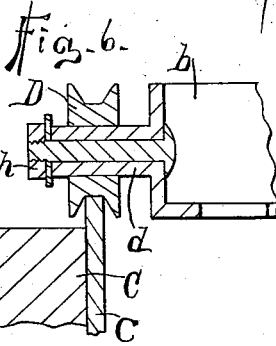
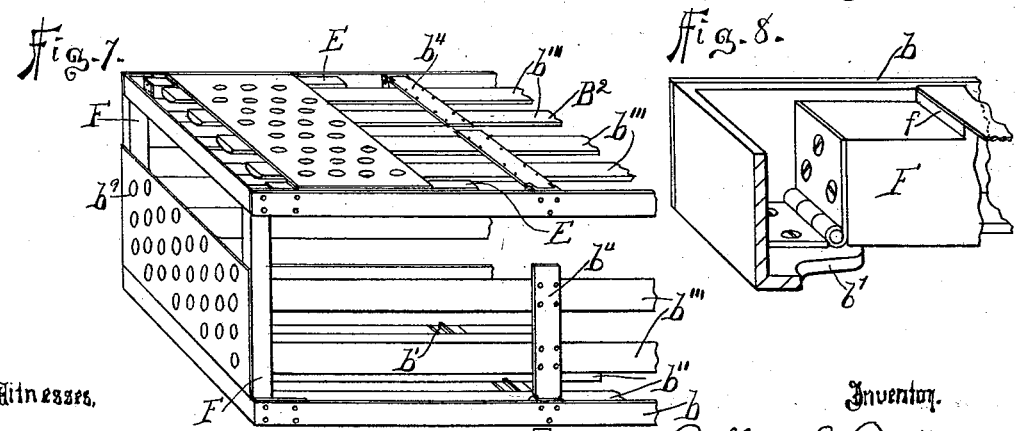
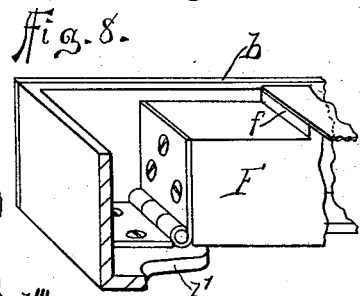
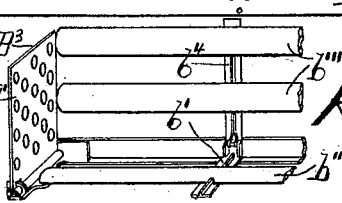
Witnesses,
O. W. Harbeson.
F. M. Townsend.
Inventor.
Delbert E. Barton
by
Hazard & Townsend
his atty.
THE NORRIS PETERS CO., PHOTO-LITHO., WASHINGTON, D. C.

UNITED STATES PATENT OFFICE.

DELBERT E. BARTON, OF LOS ANGELES, CALIFORNIA.

CONVERTIBLE FRUIT-CAR.

SPECIFICATION forming part of Letters Patent No. 523,065, dated July 17, 1894.

Application filed September 26, 1893. Serial No. 486,507. (No model.)

*To all whom it may concern:*

Be it known that I, DELBERT E. BARTON, a citizen of the United States, residing at Los Angeles, in the county of Los Angeles and State of California, have invented a certain new and useful Convertible Fruit, Vegetable, and General Merchandise Car, of which the following is a specification.

The object of my invention is to provide more convenient and economic methods and means for loading, unloading and transporting, with and without ventilation and refrigeration fruit and vegetables which are liable to become heated or jammed during transportation, and to provide a car which can ordinarily be used for general merchandise but comprises within itself elements which make the car readily and conveniently convertible into a car in which vegetables and fruits can be practically shipped in bulk and without the use of the independent crates and boxes ordinarily employed in shipments of fruit and vegetables.

Another object is to provide improved means for more perfect ventilation of the cargo of fruit or vegetables.

My invention can be applied to ships and other conveyances without departing from the spirit of my invention and I desire my claim to cover such use, but it is only necessary to explain its application to a railway car for such explanation will indicate its adaptability to other conveyances so that those skilled in the art to which it appertains can apply it in such conveyances and other situations where required.

My invention comprises the combination with the body or box of a car of series of long, narrow, portable and foldable ventilated crates adapted and arranged to fit within the car or other conveyance cross-wise of the chamber of the car and extending from side to side thereof, and adapted to be bodily removed therefrom for the purpose of loading and unloading, and replaced therein with their loads of fruit within them respectively, or empty and folded, as the case may be, means for sustaining and supporting the crates in series, one above another within the car; and means adapted and arranged at the upper part of the car to sustain and support out of the way of other cargoes the folded trays when the same are not in use.

My invention also comprises other features and combinations hereinafter more particularly described.

The accompanying drawings illustrate my invention.

Figure 1 is a perspective view of the interior of a car embodying my invention, showing a tier of loaded crates at the farther end of the car and series of foldable crates on their rack at the top of the car and a single loaded crate in position near the doors of the car ready to be pushed back to form the lower one of a second series of crates in the car. Fig. 2 is a perspective fragmentary detail of one of my improved crates folded and in position on the track, fragments of which are shown. Fig. 3 is a plan view (on a smaller scale) of the crate folded. Fig. 4 is a perspective view illustrating the use of my invention in transporting cabbages, celery, &c. Fig. 5 is a perspective view of one end of a modified form of my crate. Fig. 6 is a detail of the anti-friction device. Fig. 7 is a view of two crates embodying another modification of the crate showing the lower crate open to receive the fruit and showing another crate folded and in place on top of the open crate. Fig. 8 is a detail of one corner of the crate shown in Fig. 7 and shows a fragment of the supporting standard hinged to the frame of the crate. Fig. 9 shows one end of a crate in which the end walls are of sheet iron hinged to the end of the crate frame.

A indicates the body of the car. A' and A'' indicate the side walls thereof.

B, B', B², B³ indicate different forms of crate.

C C' indicate running supports or tracks secured to and arranged along the inner side of the side walls A' A'' of the car, at intervals, one above another, sufficient to accommodate the loaded crates when placed upon such support and allow a ventilating space between the crates when arranged one above another upon such supports or tracks.

In the form which I prefer, the crates are provided at their ends respectively with two anti-friction rollers D D which are grooved to fit upon and run upon metallic track flanges or plates $c\ c'$ respectively attached to the opposite tracks C C' and projecting above the top thereof to receive the grooved wheels; thus allowing the crates, when placed upon the tracks to be easily shoved there-along from the doorways of the car to the place within the car which they are to occupy during transportation.

If the anti-friction rollers D are dispensed with, the crates are made sufficiently long to rest upon the supports C C' and when thus placed, they can be shoved along the tracks though not so easily as when the anti friction-device is employed. To be understood, such modification needs no illustration and therefore is not shown in the drawings.

In order to provide against the cramping or binding of the crates against the sides of the car which might occur by reason of the inequalities of construction of the car or by the swelling or warping of the walls of the car by dampness, or other causes, and also to avoid the binding which is liable to occur when the loaded crates are shoved along the tracks by one person, I mount the grooved wheels or rollers upon spindles $d$ having a greater bearing length than the thickness of the wheel or roller so that the rollers can slide along the spindles toward and from the frame $b$ of the crate. By this means the supports of the crate are made self-adjusting with relation to each other within the limits of ordinary car construction, and the swelling, springing and shrinkage which may occur, and if in moving the crate along the track, it is thrown slightly diagonal across the car the rollers will remain on the track, allowing the spindles to slip therethrough and this avoids the cramping or binding which would occur if the spindles did not have lateral play with relation to the track. The rollers are secured on the spindles by nuts $h$ and thus serve to hold the crates on the track.

My improved crate comprises a bottom crate frame $b$ of strap-iron bent in cross-section to give strength and rigidity, cross-bars $b'$ secured to such frame, wooden bottom slats $b''$ secured to such cross-bars, side-walls comprising longitudinal side slats $b'''$ secured to standards $b^4$ hinged to the side bars of the bottom frame $b$, and suitable end walls $b^5$ secured to the side walls and adapted to fold toward or upon the bottom frame of the crate.

$b^6$ indicates ties or straps connecting the opposite standards $b^4$ of the side walls with each other to prevent the side walls from being spread apart by the weight of the load.

The end walls may be made of canvas or other suitable flexible material which can be folded down beneath the side walls when they are in their folded position as shown at $b^5$ in Fig. 2; or the end walls may be made of sheet-iron perforated to allow the air to pass therethrough as shown at $b^9\ b^{9\prime}$ in Figs. 7 and 9, or they may be made of wire netting or of some other suitable contrivance, (not necessary to be illustrated,) which may be made to fold upon or toward the bottom or floor of the crate when the crate is folded.

In the form shown in Fig. 5 the end walls are made of two slats or bars $b^7\ b^8$ respectively hinged to the opposite side walls of the crate and adapted to fold thereagainst when the crate is to be folded. Suitable fastenings $e$ are provided to secure the free ends of the slats respectively to the wall of the crate opposite that to which they are hinged respectively.

I have shown the car provided with permanent means for sustaining the crates in position but I wish my claim to include the use of long open ventilated crates extending across the car from side to side thereof and portable and adapted to be removed from the car loaded or unloaded and replaced therein loaded or unloaded and adapted to be held in place by the side walls of the car in combination with any suitable supports. The lowest supports might be loose ordinary blocks or strips of wood resting on the floor and taking the place of the lowest of the fixed tracks which I have shown; but I wish my claim to cover such modifications so that the same will be an infringement of my claim; the several crates arranged above the bottom crate may be supported without the tracks which I have shown, and yet not depart from the spirit of my invention; for example, in Figs. 7 and 8 the end of the crate is provided with two posts F F hinged to the bottom frame $b'$ at the corners of the crate and adapted to fold down into such frame as specially indicated in Fig. 8. This post is provided with an offset and shoulder $f$ arranged to fit upon the end of the frame $b'$ when the post is in its upright position as shown in Fig. 7. When the posts are erect they form supports for the next crate above and the sheet-iron plate $b^9\ b^{9\prime}$, or other equivalent device secured to the standards, forms the end wall. The side walls of the car prevent lateral movement of the crates.

My improved foldable crate in its several forms is adapted to fold into a flat body about an inch in thickness and of equal width with the open crate so that when the crates are thus folded, if they are placed with their ends or their supporting wheels upon the tracks or supports along the sides of the car and are made to lie edge to edge, extending across the car from side to side they will form unitedly, a ventilated platform suitable for holding cabbages, celery and other fragile vegetables of sizes which would be inconvenient for packing in the crates in their open form or which would not pack economically into the crate when the sides are upright.

The bottom slats of the crates are secured to the cross-bars of the bottom of the crate at intervals apart to allow the circulation of the air; and the slats upon the foldable sides are set at like distances apart and with relation to the bottom slats so that when the sides are folded toward the bottom frame the side slats will rest upon and coincide with the bottom slats and leave free ventilating spaces between the slats and through the platform thus formed by the folded crate so that such folded crate is adapted for use in supporting cargoes which require ventilation.

In practice, the crates, when not in use, are folded and packed away, one upon another, upon the upper track or support $C'''$ $C^4$ at the top of the car and the car is then ready for the reception of ordinary cargoes of merchandise.

When it is desired to ship fruit such as oranges, &c., the crates are taken down from their storage rack $C'''$ $C^4$ and taken out of the car and opened and are then filled with fruit. They are preferably of such dimensions that they will hold respectively about one hundred and fifty pounds of oranges but they may be of a greater or less size. They constitute a convenient load for two men and in practice when they are loaded with the fruit, they are carried by the men into the car and the first crate is placed upon the lowest track with its grooved wheels resting upon the track-plates $c\ c'$. Then one man can easily push the loaded crate back into the end of the car. The next plate when loaded is placed upon the tracks next above the crate within the car and is then shoved back into position above the first crate and this is continued until the full tier of crates is in position at the farther end of the car; then the second tier is begun and the work is continued until the cars are filled to the doors. The last tier of crates is then secured in place by any suitable means; such as for example, bulkheads which are not shown in the drawings for the reason that their construction and arrangement will be readily understood by those versed in the art without illustration.

The car is to be fitted with a sufficient number of crates to fill all the tracks excepting the storage track or rack $C'''$ $C^4$ at the top of the car; and sufficient space is left between the storage rack and the roof of the car to allow for the storage one above another of folded crates equal in number to the number of cargo sustaining tracks $C\ C'$ designed for the unfolded crates beneath the rack $C'''$, $C^4$ so that the car is capable of carrying all of the crates without interfering with the proper loading of the car with ordinary merchandise when the crates are not in use.

When it is desired to ship cabbage, celery, water-melons and other vegetables of a fragile nature which are liable to be crushed or are of unwieldy or inconvenient sizes for packing in narrow crates, the crates are placed, in their folded form, upon the tracks edge to edge to form a platform extending from the end of the car toward the door, and this platform is then covered with a layer of the cabbage, celery, or other vegetables to be shipped. The several tracks are thus finally provided with platforms of the folded crates, and the car is fully loaded from its ends to the doors with vegetables placed upon the platforms thus made. The last tier of crates is then secured by the bulkheads or other fastening device, not shown.

In unloading the car which has been loaded with vegetables upon the platforms thus made, the vegetables nearest the door are first removed and as the unloading progresses, the unloaded crates are removed from their tracks and placed upon the rack $C'''$ $C^4$ above, until the unloading has been fully accomplished, thus always giving unobstructed access to the loaded portion of the platforms until the platforms and vegetables are entirely removed.

In the car loaded with the crates in their open form, as indicated in Fig. 1, the several crates abutting against each other form supports for each other against the jars caused by sudden starting or stopping of the car, and the side walls of the car serve to sustain the crates against their movement sidewise of the car.

To hold the fruit firmly within the crate and prevent the same from chafing, I provide each crate with a netting H which may be of twine, or tape, strips of canvas or leather straps. This netting is of a mesh somewhat smaller than the fruit to be transported in the car and is secured to the crate by straps $h^2\ h^2$ which are buckled or otherwise secured to the body of the crate. This leaves the fruit open to the air but holds it securely in place.

When general merchandise is to be transported the crates may be folded and stored on the racks $C'''$ $C^4$ out of the way of the cargo. If bulkheads are used for fastening the crates they may be stowed away in the space above the folded crates.

The folded crates may be used as supports from which to suspend meats shipped in refrigeration.

Now, having described my invention, what I claim as new, and desire to secure by Letters Patent, is—

1. In combination with the body of the car, series of long narrow portable and foldable ventilated crates adapted and arranged to fit within the car and extend crosswise of the chamber of the car from side to side thereof and to be bodily removed therefrom for the purpose of loading and unloading, and replaced therein with their loads of fruit in them respectively; means for sustaining and supporting the crates in series one above another in the car; means arranged at the upper part of the car to sustain and support, out of the way of other cargoes, the folded trays when the same are not in use.

2. In combination with the body of the car, series of tracks arranged along the inner sides of the side walls of the car; series of long narrow foldable and portable crates adapted and arranged to fit within the car crosswise of the chamber of the car and to rest upon such tracks and to be bodily removed therefrom for the purpose of loading and unloading and to be replaced thereon with their loads of fruit within them respectively.

3. In combination with the body of a car, series of tracks arranged along the inner sides of the side walls of the car and provided with the track flanges; series of long, narrow, portable and foldable crates adapted and arranged to fit within the car crosswise of the chamber of the car and provided with the anti-friction rollers grooved to fit upon the track flanges.

4. In combination with the body of the car, series of tracks arranged along the inner sides of the side walls of the car and provided with the track flanges; series of long narrow portable and foldable crates adapted and arranged to fit within the car crosswise of the chamber of the car and provided upon their ends with the spindles; the anti-friction rollers respectively of a thickness less than the length of the bearing portion of the respective spindles, mounted upon such spindles and adapted to slide back and forth thereon and provided with grooves fitted upon the flanges of the tracks.

5. In combination with the body of the car, the bottom crate frame; the cross-bars secured to such frame; the bottom slats secured to such cross-bars; the side walls comprising the standards hinged to the side walls of the bottom frame, and the side slats secured to such standards; suitable end walls secured to the side walls and adapted to fold toward the bottom of the crate and means for supporting the crate frame with relation to the body of the car.

6. In combination with the car, the bottom crate frame; the cross-bars secured to such frame; the bottom slats secured to such cross-bars; the side walls comprising the standards hinged to the side walls of the bottom frame and the side walls secured to such standards at such points therealong that when the standards are folded down toward the bottom frame the side slats will coincide with and rest upon the bottom slats and leave free ventilating spaces through the platform thus formed; suitable end walls secured to the side walls and adapted to fold toward the bottom of the crate frame and means for supporting the crate frame with relation to the body of the car.

7. In combination with the body of the car the bottom crate frame; the cross-bars secured to such frame; the bottom slats secured to such cross-bars; the side walls comprising the standards hinged to the side walls of the frame and the side walls secured to such standards and suitable end walls secured to the side walls and adapted to fold toward the bottom of the crate; and the ties connecting the opposite standards of the side walls with each other and means for supporting the crate frame with relation to the body of the car.

8. In combination with the body of the car or other conveyance, series of opposite tracks arranged along the opposite inner sides of the side walls of the chamber of the car; series of long, narrow, portable crates adapted and arranged to fit within the car crosswise of the chamber of the car and having their ends adapted and arranged to rest upon and run upon such opposite tracks; the crates being adapted and arranged to be bodily removed from the tracks and from the chamber of the car for the purpose of loading and unloading and to be replaced thereon with their loads of fruit within them respectively.

9. In combination with the body of the car or other conveyance, series of tracks arranged along the opposite walls thereof, and series of long, narrow portable crates adapted and arranged to fit upon and run upon the tracks and to fold together to form platforms for supporting cabbages, &c., substantially as set forth.

DELBERT E. BARTON.

Witnesses:
JAMES R. TOWNSEND,
ALFRED I. TOWNSEND.